US012580186B2

(12) United States Patent
Shin et al.

(10) Patent No.: US 12,580,186 B2
(45) **Date of Patent: *Mar. 17, 2026**

(54) NEGATIVE ACTIVE MATERIAL COMPOSITE FOR RECHARGEABLE LITHIUM BATTERY, METHOD OF PREPARING THE SAME, AND NEGATIVE ELECTRODE AND RECHARGEABLE LITHIUM BATTERY INCLUDING THE SAME

(71) Applicant: SAMSUNG SDI CO., LTD., Yongin-si (KR)

(72) Inventors: Changsu Shin, Suwon-si (KR); Young-Min Kim, Suwon-si (KR); Soonho Ahn, Suwon-si (KR); Jaehou Nah, Suwon-si (KR); Jaemyung Kim, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/777,265

(22) Filed: Jul. 18, 2024

(65) Prior Publication Data

US 2024/0372085 A1 Nov. 7, 2024

Related U.S. Application Data

(63) Continuation of application No. 16/844,968, filed on Apr. 9, 2020, now Pat. No. 12,107,267, which is a (Continued)

(30) Foreign Application Priority Data

Feb. 28, 2019 (KR) ........................ 10-2019-0024133
Feb. 7, 2020 (KR) ........................ 10-2020-0015218

(51) Int. Cl.
*H01M 4/00* (2006.01)
*H01M 4/04* (2006.01)
(Continued)

(52) U.S. Cl.
CPC ......... *H01M 4/386* (2013.01); *H01M 4/0471* (2013.01); *H01M 4/134* (2013.01);
(Continued)

(58) Field of Classification Search
CPC ...... H01M 4/366; H01M 4/133; H01M 4/587; H01M 10/0525; H01M 2004/021;
(Continued)

(56) References Cited

U.S. PATENT DOCUMENTS 12,107,267 B2 * 10/2024 Shin ...................... H01M 4/134
2009/0136847 A1 5/2009 Jeong et al.
(Continued)

FOREIGN PATENT DOCUMENTS

CN 103035919 A 4/2013
CN 103490045 A 1/2014
(Continued)

OTHER PUBLICATIONS

US Final Office Action dated Oct. 7, 2024, issued in U.S. Appl. No. 16/700,203 (12 pages).

(Continued)

*Primary Examiner* — Nicholas P D'Aniello
(74) *Attorney, Agent, or Firm* — Womble Bond Dickinson (US) LLP

(57) ABSTRACT

A negative active material composite includes a core and a coating layer around (surrounding) the core. The core includes amorphous carbon and silicon nanoparticles, the
(Continued)

1 coating layer includes amorphous carbon, and an adjacent distance between the silicon nanoparticles is less than or equal to about 100 nm.

12 Claims, 7 Drawing Sheets

Related U.S. Application Data continuation-in-part of application No. 16/700,132, filed on Dec. 2, 2019, now abandoned.

(51) Int. Cl.
*H01M 4/134* (2010.01)
*H01M 4/1395* (2010.01)
*H01M 4/36* (2006.01)
*H01M 4/38* (2006.01)
*H01M 4/66* (2006.01)
*H01M 10/0525* (2010.01)
*H01M 4/02* (2006.01)

(52) U.S. Cl.
CPC ......... *H01M 4/1395* (2013.01); *H01M 4/364* (2013.01); *H01M 4/663* (2013.01); *H01M 4/667* (2013.01); *H01M 10/0525* (2013.01); *H01M 2004/021* (2013.01); *H01M 2004/027* (2013.01); *H01M 2004/028* (2013.01)

(58) Field of Classification Search
CPC ........... H01M 2004/027; H01M 4/131; H01M 4/134; H01M 4/386; H01M 4/485; H01M 4/1393; Y02E 60/10
See application file for complete search history.

(56) References Cited

U.S. PATENT DOCUMENTS

| | | | | |
|---|---|---|---|---|
| 2009/0269669 | A1 | 10/2009 | Kim et al. | |
| 2010/0143798 | A1 | 6/2010 | Zhamu et al. | |
| 2011/0281180 | A1 | 11/2011 | Kim et al. | |
| 2012/0064409 | A1* | 3/2012 | Zhamu | H01M 4/133 252/502 |
| 2012/0115033 | A1 | 5/2012 | Kim et al. | |
| 2013/0209881 | A1 | 8/2013 | Do et al. | |
| 2013/0334468 | A1 | 12/2013 | Taniguchi et al. | |
| 2015/0099187 | A1 | 4/2015 | Cui et al. | |
| 2015/0118567 | A1* | 4/2015 | Chen | H01M 4/366 427/122 |
| 2015/0243969 | A1 | 8/2015 | Ku et al. | |
| 2015/0270536 | A1 | 9/2015 | Kawakami et al. | |
| 2016/0211514 | A1 | 7/2016 | Youm | |
| 2016/0315311 | A1 | 10/2016 | Jeon et al. | |
| 2016/0344018 | A1 | 11/2016 | Chiu et al. | |
| 2017/0040610 | A1 | 2/2017 | Otsuka et al. | |
| 2017/0200941 | A1 | 7/2017 | Yuge | |
| 2017/0309902 | A1 | 10/2017 | Jo et al. | |
| 2017/0346085 | A1 | 11/2017 | Suh et al. | |
| 2018/0083272 | A1 | 3/2018 | Son et al. | |
| 2018/0097229 | A1 | 4/2018 | Jo et al. | |
| 2018/0269519 | A1 | 9/2018 | Jo et al. | |
| 2019/0027781 | A1 | 1/2019 | Lee et al. | |
| 2019/0074506 | A1 | 3/2019 | Troegel et al. | |
| 2020/0194778 | A1 | 6/2020 | Troegel | |
| 2020/0280060 | A1 | 9/2020 | Kim et al. | |
| 2020/0339821 | A1 | 10/2020 | Becker | |

FOREIGN PATENT DOCUMENTS

| | | | |
|---|---|---|---|
| CN | 103682287 | A | 3/2014 |
| CN | 105355870 | A | 2/2016 |
| CN | 103915609 | B | 10/2017 |
| CN | 108780885 | A | 11/2018 |
| CN | 109037601 | A | 12/2018 |
| EP | 2387089 | A1 | 11/2011 |
| EP | 3046167 | A1 | 7/2016 |
| JP | 2018-110076 | A | 7/2018 |
| KR | 10-0898293 | B1 | 5/2009 |
| KR | 10-1126202 | B1 | 3/2012 |
| KR | 10-2014-0085822 | A | 7/2014 |
| KR | 10-2014-0094676 | A | 7/2014 |
| KR | 10-2015-0062918 | A | 6/2015 |
| KR | 10-2016-0040103 | A | 4/2016 |
| KR | 10-2016-0088181 | A | 7/2016 |
| KR | 10-2016-0126857 | A | 11/2016 |
| KR | 10-2017-0047975 | A | 5/2017 |
| KR | 10-2017-0069163 | A | 6/2017 |
| KR | 10-2018-0031585 | A | 3/2018 |
| KR | 10-2018-0035752 | A | 4/2018 |
| KR | 10-2018-0118714 | A | 10/2018 |
| WO | WO 2015/105534 | A1 | 7/2015 |

OTHER PUBLICATIONS

"A Basic Guide Io Particle Characterization," Malvern Instruments Worldwide—Inform White Paper, 2012, XP055089322 (26 pages).
Lanson, Bruno, Decomposition of Experimental X-Ray Diffraction Patterns (Profile Fitting): A Convenient Way to Study Clay Minerals, vol. 45, No. 2, 1997 (15 pages).
Li, Shuo et al., "Silicon/carbon composite microspheres with hierarchical core-shell structure as anode for lithium ion batteries," Electrochemistry Communications, vol. 49, 2014 (5 pages).
Qu, Fangmu et al., "Coaling nanoparticle-assembled Si microspheres with carbon for anode material in lithium-ion battery," Journal of Physics and Chemistry of Solids, vol. 124, 2019 (6 pages).
Zhang, Lei et al., "A Green and Facile Way to Prepare Granadilla-Like Silicon-Based Anode Materials for Li-ion Batteries," Advanced Functional Materials, vol. 26, 2016 (7 pages).
Extended European Search Report dated Jul. 2, 2020, for corresponding European Patent Application No. 20156916.7 (7 pages).
EPO Extended Search Report dated Jul. 8, 2020, for corresponding European Patent Application No. 20156838.3 (15 pages).
KR Office Action dated Aug. 24, 2020, for corresponding Korean Patent Application No. 10-2020-0015218 (7 pages).
KR Office Action dated Aug. 24, 2020, for corresponding Korean Patent Application No. 10-2019-0024134 (8 pages).
US Office Action mailed Apr. 7, 2022, for U.S. Appl. No. 16/700,203 (14 pages).
EPO European Office Action dated Aug. 11, 2022, for corresponding European Patent Application No. 20156838.3 (4 pages).
US Final Office Action dated Sep. 20, 2022, for corresponding U.S. Appl. No. 16/700,203 (10 pages).
CN Office Action dated Sep. 29, 2022, with English Translation, issued in corresponding Chinese Patent Application No. 202010101253.3 (20 pages).
CN Office Action dated Oct. 14, 2022, with English translation, issued in corresponding Chinese Patent Application No. 202010101140.3 (19 pages).
KR Notice of Allowance dated Oct. 17, 2022, with English translation, issued in corresponding Korean Patent Application No. 10-2021-0011898 (10 pages).
US Advisory Action dated Dec. 1, 2022, issued in U.S. Appl. No. 16/700,203 (3 pages).
CN Office Action dated Mar. 13, 2023, with English translation, for Chinese Patent Application No. 202010101140.3 (9 pages).
US Office Action dated Apr. 6, 2023, issued in U.S. Appl. No. 16/700,203 (12 pages).
CN Office Action dated Apr. 7, 2023, with English translation, for Chinese Patent Application No. 202010101253.3 ( 18 pages).
CN Office Action dated Aug. 22, 2023, for Chinese Patent Application No. 202010101253.3 (17 pages).
US Final Rejection dated Sep. 13, 2023, for U.S. Appl. No. 16/700,203 (12 pages).
US Office Action dated Apr. 9, 2024, issued in U.S. Appl. No. 16/700,203 (11 pages).
US Office Action dated Jul. 18, 2025, issued in U.S. Appl. No. 16/700,203 (13 pages).

(56) References Cited

OTHER PUBLICATIONS

Extended European Search Report issued in corresponding EP Application No. 25179849.2, dated Aug. 14, 2025 (12 pages).
US Final Office Action dated Nov. 7, 2025, issued in U.S. Appl. No. 16/700,203 (12 pages).

* cited by examiner

NEGATIVE ACTIVE MATERIAL COMPOSITE FOR RECHARGEABLE LITHIUM BATTERY, METHOD OF PREPARING THE SAME, AND NEGATIVE ELECTRODE AND RECHARGEABLE LITHIUM BATTERY INCLUDING THE SAME

CROSS-REFERENCE TO RELATED APPLICATIONS

This application is a continuation of U.S. patent application Ser. No. 16/844,968, filed Apr. 9, 2020, which is a continuation-in-part of U.S. patent application Ser. No. 16/700,132, filed on Dec. 2, 2019, which claims priority to and the benefit of Korean Patent Application No. 10-2019-0024133, filed on Feb. 28, 2019, in the Korean Intellectual Property Office and Korean Patent Application No. 10-2020-0015218, filed on Feb. 7, 2020, in the Korean Intellectual Property Office, the entire content of each of which is incorporated herein by reference.

BACKGROUND

1. Field

One or more aspects of example embodiments of the present disclosure are related to a negative active material composite, method of preparing the same, a negative electrode, and a rechargeable lithium battery including the same.

2. Description of the Related Art

Rechargeable lithium batteries have recently drawn attention as a power source for small portable electronic devices. A rechargeable lithium battery uses an organic electrolyte solution, and thereby has a discharge voltage twice as high as a conventional battery using an alkali aqueous solution, as well as an accordingly high energy density.

Lithium-transition metal oxides having a structure capable of intercalating/deintercalating lithium ions (such as $LiCoO_2$, $LiMn_2O_4$, $LiNi_{1-x}Co_xO_2$ ($0<x<1$), and/or the like) have been used as positive active materials in rechargeable lithium batteries.

Various carbon-based materials capable of intercalating/deintercalating lithium ions (such as artificial graphite, natural graphite, hard carbon, and/or the like) have been used as negative active materials. Recently, non-carbon-based negative active materials such as silicon and tin have been researched in order to obtain high capacity.

SUMMARY

One or more aspects of embodiments of the present disclosure are directed toward a negative active material composite having reduced expansion due to suppression of side reaction(s) with electrolyte.

One or more aspects of embodiments of the present disclosure are directed toward a method of preparing the negative active material composite.

One or more aspects of embodiments of the present disclosure are directed toward a negative electrode including the negative active material composite.

One or more aspects of embodiments of the present disclosure are directed toward a rechargeable lithium battery having improved initial efficiency and cycle-life characteristics by including the negative electrode.

One or more example embodiments of the present disclosure provide a negative active material composite including a core and a coating layer around (e.g., surrounding) the core, the core including amorphous carbon and silicon nanoparticles, the coating layer including amorphous carbon, and an adjacent distance between the silicon nanoparticles (e.g., a distance between adjacent silicon nanoparticles) being less than or equal to about 100 nm.

The silicon nanoparticles may have an average particle diameter (D50) of about 50 nm to about 150 nm.

An X-ray diffraction (XRD) peak corresponding to a (111) plane of the silicon nanoparticles may have a full width at half maximum (FWHM) measurement of about 0.3° to about 7°.

The silicon nanoparticles may have an aspect ratio of about 2 to about 8.

The silicon nanoparticles may be included in an amount of about 20 wt % to about 80 wt % based on a total weight of the negative active material composite.

The amorphous carbon may be a soft carbon, a hard carbon, a mesophase pitch carbonized product, a fired coke, or any combination thereof.

The amorphous carbon may be included (e.g., in total) in an amount of about 20 wt % to about 80 wt % based on a total weight of the negative active material composite.

The coating layer may have a thickness of about 1 nm to about 900 nm.

The negative active material composite may have an average particle diameter (D50) of about 2 μm to about 15 μm.

An average pore size of the negative active material composite may be less than or equal to about 200 nm.

A total pore volume of the negative active material composite may be less than or equal to about $3.0\times10^{-2}$ $cm^3/g$.

The negative active material composite may have a Brunauer-Emmett-Teller (BET) specific surface area of less than or equal to about 10 $m^2/g$.

The negative active material composite may consist of amorphous carbon and silicon nanoparticles. In some embodiments, the core of the negative active material composite may not include (e.g., may exclude) graphite.

One or more example embodiments of the present disclosure provide a method of preparing a negative active material composite that includes mixing silicon nanoparticles and amorphous carbon, dispersing the same to prepare a mixture; spraying, drying, and compressing the mixture to provide a molded body; and heat-treating the molded body.

The compressing may be performed at a pressure of about 50 MPa to about 150 MPa.

The heat-treating may be performed at a temperature of about 700° C. to about 1100° C.

One or more example embodiments of the present disclosure provide a negative electrode including a current collector and a negative active material layer on the current collector, wherein the negative active material layer includes a negative active material, and the negative active material includes the negative active material composite.

One or more example embodiments of the present disclosure provide a rechargeable lithium battery including a positive electrode including a positive active material; the negative electrode; and an electrolyte with the positive electrode and the negative electrode.

The pore volume formed inside the negative active material composite is controlled or selected to suppress or reduce side reaction(s) between the electrolyte and the silicon nanoparticles, thereby providing a rechargeable lithium battery having improved initial efficiency and cycle-life characteristics.

DETAILED DESCRIPTION

Figure 1A:
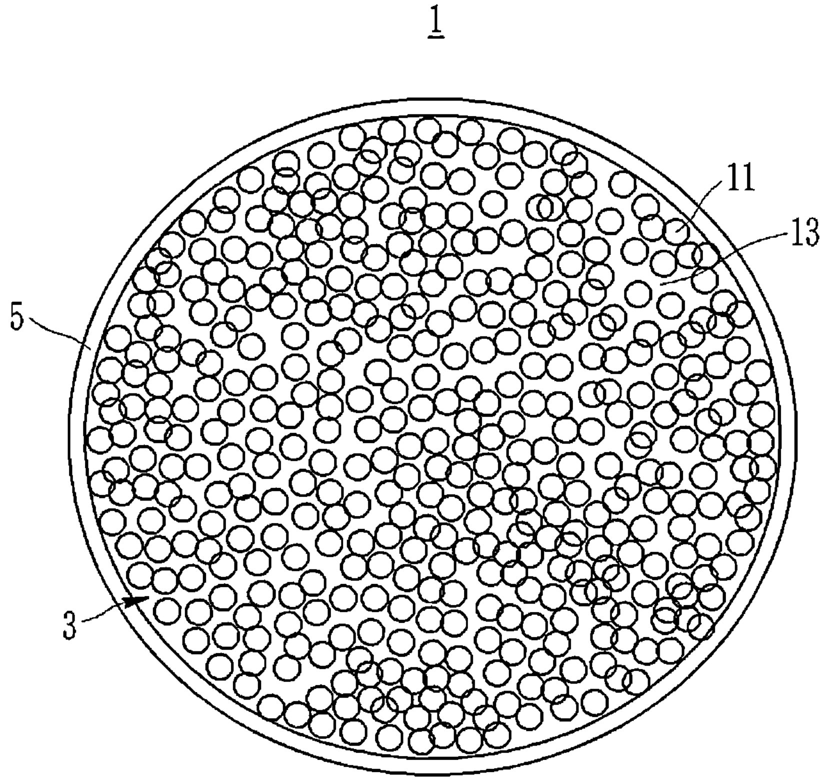
FIG. 1A is a schematic view of a negative active material composite according to an embodiment of the present disclosure.

Hereinafter, embodiments of the present disclosure are described in more detail. However, these embodiments are examples, the present disclosure is not limited thereto, and the present disclosure is defined by the scope of claims.

In the drawings, the thicknesses of layers, films, panels, regions, etc., may be exaggerated for clarity. Like reference numerals designate like elements throughout the specification, and duplicative descriptions thereof may not be provided.

It will be understood that when an element such as a layer, film, region, plate, and the like is referred to as being "on" another element, or is referred to as "surrounding" another element, it may be directly on or surrounding the other element, or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

A negative active material composite according to an embodiment of the present disclosure includes a core and a coating layer around (e.g., surrounding) the core, wherein the core includes amorphous carbon and silicon nanoparticles, the coating layer includes amorphous carbon, and an adjacent distance between the silicon nanoparticles (e.g., a distance between adjacent silicon nanoparticles) is less than or equal to about 100 nm. As used herein, the terms "around" (e.g., "surrounding") describes that the coating layer is positioned on at least a portion of the outermost surface, outer surface, or surface area of the core so that the coating layer at least partially covers or encloses the core when particles of the negative active material composite are observed from the outside. In some embodiments, the coating layer may substantially surround the core (e.g., substantially cover the outer surface area of the core, for example, about 50% to about 100% of the outer surface area, about 70% to about 95% of the outer surface area, or about 80% to about 90% of the outer surface area).

Hereinafter, the negative active material composite and silicon nanoparticles according to an embodiment of the present disclosure are described with reference to FIGS. 1A and 2, and a negative active material composite in the related art is described with reference to FIG. 1B.

Figure 1B:
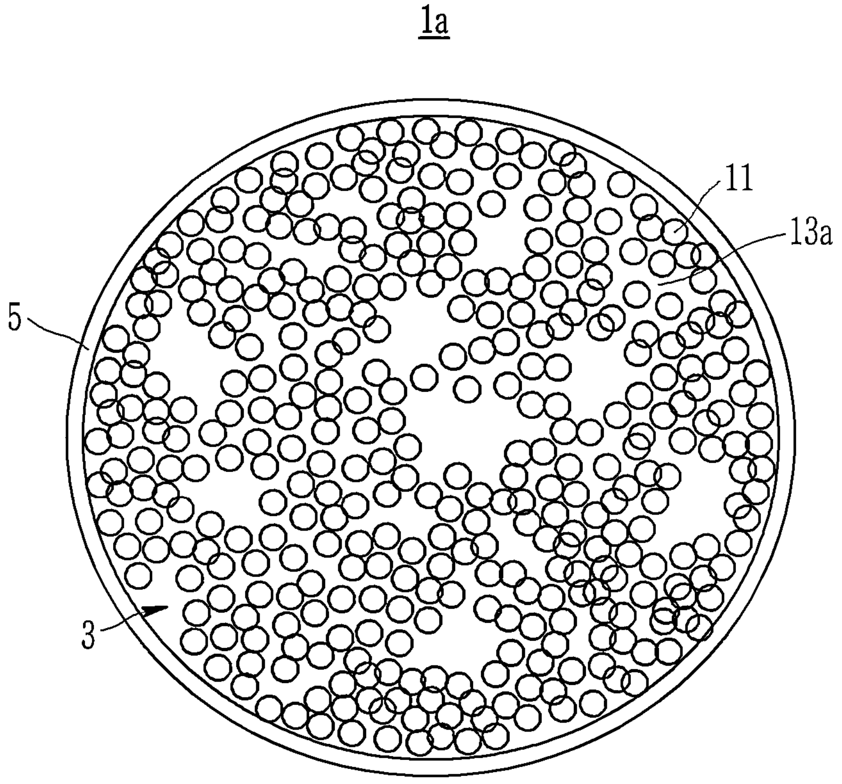
FIG. 1B is a schematic view of a negative active material composite in the related art.
Figure 2:
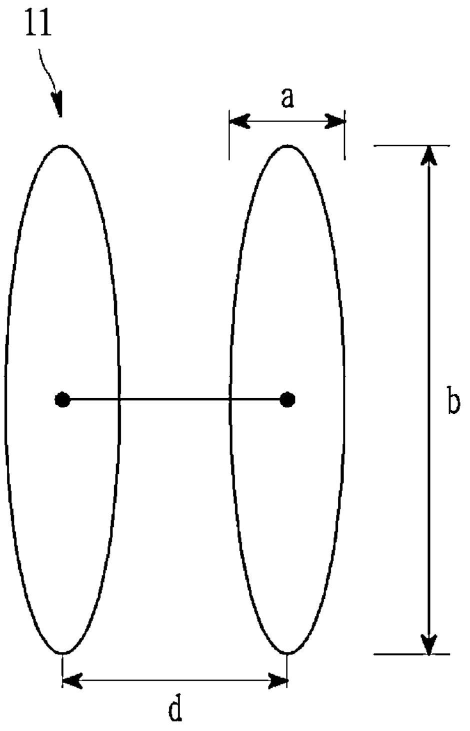
FIG. 2 is a schematic view of two adjacent silicon nanoparticles of a negative active material composite according to an embodiment of the present disclosure.

FIG. 1A is a schematic view of a negative active material composite according to an embodiment of the present disclosure; FIG. 1B is a schematic view of a negative active material composite of the related art; and FIG. 2 is a schematic view of two adjacent silicon nanoparticles of a negative active material composite according to an embodiment of the present disclosure.

The negative active material composite 1 includes a core 3 and a coating layer 5 around or surrounding the core, wherein the core 3 includes amorphous carbon and silicon nanoparticles 11, and the coating layer 5 includes amorphous carbon. Pores 13 are thereby formed in the core 3.

In some embodiments, the core 3 may consist of amorphous carbon and silicon nanoparticles 11. In some embodiments, the core 3 may not include (e.g., may exclude) graphite. Non-limiting examples of the excluded graphite include artificial graphite, natural graphite, and crystalline carbon.

In some embodiments, the adjacent distance (d) between silicon nanoparticles 11 included in the core 3 may be less than or equal to about 100 nm (e.g., about 1 nm to about 100 nm, about 10 nm to about 100 nm, or about 20 nm to about 100 nm), less than or equal to about 90 nm, less than or equal to about 80 nm, less than or equal to about 70 nm, less than or equal to about 65 nm, less than or equal to about 60 nm, less than or equal to about 55 nm, less than or equal to about 50 nm, less than or equal to about 45 nm, less than or equal to about 40 nm, or less than or equal to about 35 nm. When the negative active material composite according to an embodiment of the present disclosure has an adjacent distance (d) between the silicon nanoparticles within the above-described ranges, an average size (diameter) of the pores 13 included in the core 3 is decreased, along with a total pore volume. In comparison, the negative active material composite 1*a* according to the related art has relatively large average size (diameter) of pores 13*a*, along with a relatively large total pore volume. For example, when the adjacent distance between the silicon nanoparticles is within the above-described ranges, permeation of an electrolyte into the core of the negative active material composite during operation of the battery may be prevented or reduced, due to the decreased pore volume inside the negative active material composite and narrowed adjacent distance between the silicon nanoparticles. As a result, side reaction(s) of the electrolyte with the negative active material composite may be suppressed or reduced, and accordingly, battery cycle-life may be improved.

As used herein, the term "adjacent distance" (d) between silicon nanoparticles 11 refers to the distance (d) between centers of adjacent silicon nanoparticles 11.

Further, as used herein, the adjacent distance (d) between the silicon nanoparticles describes that about 50% to about 100%, for example, about 60% to about 100%, about 70% to about 100%, or about 80% to about 100% of the total number of the silicon nanoparticles included in the core of the negative active material composite are positioned to have one or more adjacent distances (d) between silicon nanoparticles within the above-described ranges. In some embodiments, the term "adjacent distance" (d) may refer to an average adjacent distance, as determined from a distribution curve of adjacent distances.

The silicon nanoparticles 11 may have an average particle diameter (D50) of about 50 nm to about 150 nm, for example, greater than or equal to about 50 nm, greater than or equal to about 60 nm, greater than or equal to about 70 nm, or greater than or equal to about 80 nm and less than or equal to about 150 nm, less than or equal to about 140 nm, less than or equal to about 130 nm, or less than or equal to about 115 nm. When the silicon nanoparticles 11 have an average particle diameter within the above-described ranges, side reaction(s) with the electrolyte may be suppressed, expansion of the silicon nanoparticles 11 may be reduced, and accordingly, initial efficiency and cycle-life characteristics may be improved. As used herein, the term "average particle diameter (D50)" may refer to the median value in a particle size distribution, as determined using a particle size analyzer, for example, a laser diffraction particle size analyzer.

When analyzed by CuKα X-ray diffraction (XRD), a peak in the XRD spectrum corresponding to the (111) plane of the silicon nanoparticles may have a full width at half maximum (FWHM) of about 0.3° to about 7° (2 theta). When the FWHM measurement is within the above range, the cycle-life characteristics may be improved.

The above XRD full width at half maximum (FWHM) may be achieved by suitably controlling or selecting a size of the silicon particles, for example by suitably changing or selecting a manufacturing process of the silicon nanoparticles.

The silicon nanoparticles 11 may have an aspect ratio (b/a) of about 2 to about 8, for example, about 2 to about 6, wherein a short diameter length (a) of the silicon nanoparticles 11 may be about 20 nm to about 50 nm, and a long diameter length (b) thereof may be about 50 nm to about 300 nm. When the silicon nanoparticles 11 have an aspect ratio (b/a), a long diameter length (b), and a short diameter length (a) within the respective above ranges, side reaction(s) between the negative active material composite and the electrolyte may be suppressed, expansion of the silicon nanoparticles may be reduced, and accordingly, initial efficiency and cycle-life characteristics may be improved.

The silicon nanoparticles 11 may be included in an amount of about 20 wt % to about 80 wt %, about 30 wt % to about 70 wt %, about 30 wt % to about 60 wt %, or about 30 wt % to about 50 wt % based on a total weight of the negative active material composite 1. When the silicon nanoparticles are included within the above-described ranges, battery capacity may be improved.

The amorphous carbon included in the core 3 may be a soft carbon, a hard carbon, a mesophase pitch carbonized product, a fired coke, or any combination thereof.

When the amorphous carbon is included in the core, side reaction(s) with the electrolyte may be suppressed or reduced by decreasing the pore volume of the negative active material composite. In addition, when the silicon nanoparticles in the negative active material composite are expanded (e.g., during and/or after doping), the amorphous carbon may buffer expansion of the silicon nanoparticles and thus suppress or reduce battery expansion (swelling). In addition, the amorphous carbon may act as a binder to thus alleviate breakage of the negative active material composite particles and maintain the shape thereof.

The coating layer 5 includes the amorphous carbon (e.g., the core may include a first portion of the amorphous carbon, and the coating layer may include a second portion of the amorphous carbon). In addition, the coating layer 5 may have a thickness of about 1 nm to about 900 nm, for example, about 5 nm to about 800 nm. Accordingly, a specific surface area of the composite may be reduced, and permeation of the electrolyte into the negative active material composite (e.g., into the core) may be prevented or reduced. As a result, side reaction(s) with the electrolyte may be minimized or reduced, and cycle-life characteristics of a battery may be improved.

In some embodiments, the amorphous carbon included in the coating layer may be a soft carbon, a hard carbon, a mesophase pitch carbonized product, a fired coke, or any combination thereof. In some embodiments, the amorphous carbon included in the coating layer 5 may be the same as or different from (e.g., composition and/or source) the amorphous carbon included in the core 3.

The amorphous carbon may be included in an amount of about 20 wt % to about 80 wt %, for example, about 20 wt % to about 70 wt %, about 20 wt % to about 60 wt %, about 20 wt % to about 50 wt %, or about 20 wt % to about 40 wt % based on a total weight of the negative active material composite 1. When the amorphous carbon is included within the above-described ranges, side reaction(s) of the negative active material composite with the electrolyte may be prevented or reduced.

The negative active material composite according to an embodiment of the present disclosure may have an average particle diameter (D50) of about 2 μm to about 15 μm, for example, about 3 μm to about 13 μm, or about 5 μm to about 10 μm. The average particle diameter (D50) may be determined using a particle size analyzer, similar to that described above. When the negative active material composite has an average particle diameter within the above-described ranges, lithium ions may easily diffuse into and/or out of the negative active material composite, and accordingly, cell resistance and/or rate characteristics may be improved. In addition, side reaction(s) with the electrolyte may be reduced by suppressing or reducing an increase (e.g., excessive increase) of a negative active material specific surface area.

In some embodiments, the average particle diameter of the negative active material composite may be obtained by appropriately or suitably controlling a crush condition and a pulverizing condition during preparation of the negative active material composite.

A total pore volume in the negative active material composite may be less than or equal to about $3.0\times10^{-2}$ $cm^3/g$, for example, less than or equal to about $2.5\times10^{-2}$ $cm^3/g$, less than or equal to about $2.3\times10^{-2}$ $cm^3/g$, less than or equal to about $2.0\times10^{-2}$ $cm^3/g$, less than or equal to about $1.9\times10^{-2}$ $cm^3/g$, less than or equal to about $1.8\times10^{-2}$ $cm^3/g$, less than or equal to about $1.7\times10^{-2}$ $cm^3/g$, less than or equal to about $1.6\times10^{-2}$ $cm^3/g$, less than or equal to about $1.5\times10^{-2}$ $cm^3/g$, less than or equal to about $1.4\times10^{-2}$ $cm^3/g$, less than or equal to about $1.3\times10^{-2}$ $cm^3/g$, less than or equal to about $1.2\times10^{-2}$ $cm^3/g$, less than or equal to about $1.1\times10^{-2}$ $cm^3/g$, less than or equal to about $1.0\times10^{-2}$ $cm^3/g$, less than or equal to about $0.9\times10^{-2}$ $cm^3/g$, less than or equal to about $0.8\times10^{-2}$ $cm^3/g$, less than or equal to about $0.7\times10^{-2}$ $cm^3/g$, less than or equal to about $0.6\times10^{-2}$ $cm^3/g$, or less than or equal to about $0.5\times10^{-2}$ $cm^3/g$. The pore volume described above may be the total volume of all pores, for example, pores having a pore size of less than or equal to about 200 nm or smaller, as described in more detail below. When the pore volume of the negative active material composite is controlled to be within the above-described ranges, initial efficiency and/or cycle-life characteristics may be improved by suppressing or reducing side reaction(s) of the electrolyte and the silicon nanoparticles.

In some embodiments, the total pore volume (e.g., of pores having a size of less than or equal to about 200 nm) may be quantitatively measured using BJH (Barrett-Joyner-Halenda) analysis equipment.

In some embodiments, the negative active material composite 1 may have a pore size (e.g., average pore size, or in some embodiments, maximum pore size) of less than or equal to about 200 nm (e.g., from about 1 nm to about 200 nm, or about 10 nm to about 200 nm), for example, less than or equal to about 170 nm, less than or equal to about 150 nm, less than or equal to about 130 nm, less than or equal to about 100 nm, or less than or equal to about 50 nm. When the negative active material composite has a pore size within the above-described ranges, side reaction(s) of the electrolyte and the silicon nanoparticles may be reduced, and accordingly, a battery having improved initial efficiency and/or cycle-life characteristics may be obtained.

The negative active material composite 1 may have a Brunauer-Emmett-Teller (BET) specific surface area of less than or equal to about 10 $m^2/g$. When the BET specific surface area is within the above-described ranges, efficiency characteristics of a battery may be improved by suppressing or reducing side reaction(s) with the electrolyte. Further, when the average pore size, total pore volume, and specific BET surface area are together (e.g., simultaneously) selected to be within the above-described ranges, the efficiency of the battery may be improved due to reduced side reactions with the electrolyte.

The silicon nanoparticles 11 and the amorphous carbon may be used (e.g., included in the negative active material composite 1) in a weight ratio of about 8:2 to about 2:8, for example, about 7:3 to about 3:7, about 7:3 to about 4:6, or about 7:3 to about 5:5. When the silicon nanoparticles and the amorphous carbon are used within the above-described ranges, an internal pore volume may be reduced, and the amorphous carbon may be uniformly or substantially uniformly dispersed inside the negative active material composite, as well as deposited on the surface thereof. For example, the amorphous carbon may be uniformly or substantially uniformly dispersed throughout the inside and on the surface of the negative active material composite. As a result, side reaction(s) with the electrolyte may be suppressed or reduced, and performance of the negative active material composite may be improved.

Hereinafter, a method of preparing a negative active material composite according to another embodiment of the present disclosure is described below.

A method of preparing the negative active material composite includes mixing silicon nanoparticles and amorphous carbon; dispersing the same to prepare a mixture; spraying, drying, and compressing the mixture to provide a molded body; and heat-treating the molded body.

First, the silicon nanoparticles and the amorphous carbon are mixed and dispersed to prepare the mixture. The silicon nanoparticles and the amorphous carbon may be the same as described above.

Next, the mixture is sprayed (e.g., on a substrate), dried, and then compressed to prepare the molded body.

The drying may be performed at about 50° C. to about 150° C. using a spray drier.

The compression may be performed under a pressure of about 50 MPa to about 150 MPa, for example, about 75 MPa to about 150 MPa, or about 75 MPa to about 125 MPa. When the mixture is compressed within the above-described pressure range, side reaction(s) of the electrolyte and the silicon nanoparticles may be suppressed or reduced by maintaining an appropriate or suitable distance between the silicon nanoparticles and controlling the pore volume of the negative active material composite. Accordingly, initial efficiency and/or cycle-life characteristics of the rechargeable lithium battery may be improved.

Subsequently, the molded body may be heat-treated to prepare the negative active material composite according to an embodiment of the present disclosure.

The heat-treating may be performed at about 700° C. to about 1100° C., for example, about 800° C. to about 1050° C., or about 900° C. to about 1000° C. When the heat-treating is performed within the above-described temperature ranges, the amorphous carbon is carbonized (e.g., converted from a liquid or paste consistency into a solid, rigid state), and thus may fortify or increase the strength of the negative active material composite. In addition, the conductivity of the negative active material may be increased and/or the initial efficiency of a battery may be improved.

In some embodiments, the heat-treating may be performed in a furnace under a nitrogen ($N_2$) atmosphere.

Another embodiment of the present disclosure provides a negative electrode including a current collector and a negative active material layer disposed on the current collector, wherein the negative active material layer includes a negative active material and the negative active material includes the negative active material composite.

The current collector may be, for example, selected from a copper foil, a nickel foil, a stainless steel foil, a titanium foil, a nickel foam, a copper foam, a polymer substrate coated with a conductive metal, and combinations thereof.

The negative active material layer may include a negative active material, and optionally a binder and a conductive material.

The negative active material may include the negative active material composite according to an embodiment of the present disclosure, and may further optionally include a material that reversibly intercalates/deintercalates lithium ions, a lithium metal, a lithium metal alloy, a material capable of doping/dedoping lithium, or a transition metal oxide.

The negative active material composite may be the same as described above.

The material that reversibly intercalates/deintercalates lithium ions may be a carbon material, for example, any carbon-based negative active material used in a rechargeable lithium battery in the related art. Non-limiting examples of the carbon-based negative active material include crystalline carbon, amorphous carbon, and combinations thereof. The crystalline carbon may be non-shaped (e.g., have no particular or set shape), and/or sheet, flake, spherical, and/or fiber shaped natural graphite and/or artificial graphite. The amorphous carbon may be a soft carbon, a hard carbon, a mesophase pitch carbonization product, fired coke, and/or the like.

The lithium metal alloy may be an alloy including lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a silicon-based material, for example, Si, $SiO_x$ ($0<x<2$), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and combinations thereof), a Si-carbon composite, Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and combinations thereof), a Sn-carbon composite, and/or the like. At least one of these materials may be mixed with $SiO_2$. The elements Q and R may each independently be selected from Mg, Ca, Sr, Ba, Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), Pb, ruthenium (Ru), osmium (Os), hassium (Hs), rhodium (Rh), iridium (Ir), palladium (Pd), platinum (Pt), copper (Cu), silver (Ag), gold (Au), Zn, cadmium (Cd), boron (B), Al, gallium (Ga), Sn, In, Ge, phosphorus (P), arsenic (As), Sb, bismuth (Bi), sulfur(S), selenium (Se), tellurium (Te), polonium (Po), and combinations thereof.

The transition metal oxide includes a lithium titanium oxide.

In the negative active material, the negative active material composite may be included in an amount of about 1 wt % to about 50 wt %, about 10 wt % to about 40 wt %, about 10 wt % to about 30 wt %, or about 10 wt % to about 20 wt % based on a total weight of the negative active material.

In the negative active material layer, the negative active material may be included in an amount of about 95 wt % to about 99 wt % based on a total weight of the negative active material layer.

The binder acts to adhere negative active material particles to each other and to adhere negative active materials to the current collector. The binder may be a non-aqueous binder, an aqueous binder, or any combination thereof.

For example, the non-aqueous binder may be or include polyacrylonitrile, polystyrene, polyvinyl chloride, carboxylated polyvinyl chloride, polyvinylfluoride, polyurethane, polytetrafluoroethylene, polyvinylidene fluoride, polyethylene, polypropylene, polyamideimide, polyimide, or any combination thereof.

The aqueous binder may be or include a styrene-butadiene rubber, an acrylated styrene-butadiene rubber (ABR), an acrylonitrile-butadiene rubber, an acrylic rubber, a butyl rubber, an ethylene oxide-containing polymer, polyvinyl pyrrolidone, an ethylenepropylene copolymer, polyepichlorohydrin, polyphosphazene, an ethylenepropylenediene copolymer, polyvinylpyridine, chlorosulfonated polyethylene, latex, polyester resin, an acrylic resin, a phenolic resin, an epoxy resin, polyvinyl alcohol, or any combination thereof.

When the aqueous binder is used as a negative electrode binder, a cellulose-based compound may be further used to provide or increase viscosity as a thickener. The cellulose-based compound includes one or more of carboxylmethyl cellulose, hydroxypropylmethyl cellulose, methyl cellulose, or alkali metal salts thereof. The alkali metal may be Na, K, or Li. The thickener may be included in an amount of about 0.1 wt % to about 3 wt % based on a total weight of the negative active material.

In the negative active material layer, a content of the binder may be about 1 wt % to about 5 wt % based on a total weight of the negative active material layer.

The conductive material is included to provide electrode conductivity. Any electrically conductive material may be used as a conductive material unless it causes an unwanted chemical change. Non-limiting examples of the conductive material include a carbon-based material (such as natural graphite, artificial graphite, carbon black, acetylene black, ketjen black, a carbon fiber, and/or the like); a metal-based material of a metal powder and/or a metal fiber including copper, nickel, aluminum, silver, and/or the like; a conductive polymer (such as a polyphenylene derivative); and mixtures thereof.

When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

Another embodiment of the present disclosure provides a rechargeable lithium battery including a positive electrode including a positive active material, the negative electrode, and an electrolyte with (between) the positive electrode and the negative electrode.

The positive electrode includes a current collector and a positive active material layer including a positive active material formed on the current collector.

The positive active material may include a lithium intercalation compound configured to reversibly intercalate and deintercalate lithium ions. For example, one or more composite oxides of a metal selected from cobalt, manganese, nickel, and a combination thereof and also including lithium may be used. For example, the compounds represented by one of the following chemical formulae may be used: $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_6O_{2-c}D_c$ ($0.90 \le a \le 1.8$, $0 \le b \le 0.5$, $0 \le c \le 0.05$); $Li_aE_{2-b}X_6O_{4-c}D_c$ ($0.90 \le a \le 1.8$, $0 \le b \le 0.5$, $0 \le c \le 0.05$); $Li_aNi_{1-b-c}CO_bX_cD_\alpha$ ($0.90 \le a \le 1.8$, $0 \le b \le 0.5$, $0 \le c \le 0.5$, $0<a \le 2$); $Li_aNi_{1-b-c}CO_bX_cO_{2-\alpha}T_\alpha$ ($0.90 \le a \le 1.8$, $0 \le b \le 0.5$, $0 \le c \le 0.05$, $0<\alpha<2$); $Li_aNi_{1-b-c}CO_bX_cO_{2-a}T_2$ ($0.90 \le a \le 1.8$, $0<b \le 0.5$, $0 \le c \le$ 0.05, $0<\alpha<2$); $Li_aNi_{1-b-c}Mn_bX_cD_\alpha$ ($0.90 \le a \le 1.8$, $0 \le b \le 0.5$, $0 \le c \le 0.05$, $0<\alpha<2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0<\alpha<2$); $Li_aNi_{1-b-c}Mn_bX_cO_{2-\alpha}T_2$ ($0.90 \le a \le 1.8$, $0 \le b \le 0.5$, $0 \le c \le 0.05$, $0<\alpha<2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0 \le e \le 0.1$); $Li_aNi_bCo_cAl_aG_eO_2$ ($0.90 \le a \le 1.8$, $0 \le b \le 0.9$, $0 \le c \le 0.5$, $0 \le d \le 0.5$, $0 \le e \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$).

In the above chemical formulae, A is selected from Ni, Co, Mn, and combinations thereof; X is selected from Al, Ni, Co, Mn, Cr, Fe, Mg, Sr, V, a rare earth element, and combinations thereof; D is selected from O, F, S, P, and combinations thereof; E is selected from Co, Mn, and combinations thereof; T is selected from F, S, P, and combinations thereof; G is selected from Al, Cr, Mn, Fe, Mg, La, Ce, Sr, V, and combinations thereof; Q is selected from Ti, Mo, Mn, and combinations thereof; Z is selected from Cr, V, Fe, Sc, Y, and combinations thereof; and J is selected from V, Cr, Mn, Co, Ni, Cu, and combinations thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous and/or crystalline. The coating element included in the coating layer may include Mg, Al, Co, K, Na, Ca, Si, Ti, V, Sn, Ge, Ga, B, As, Zr, or a mixture thereof. The coating layer may be applied using any suitable method (e.g., a method having no adverse influence on the properties of a positive active material by using these elements in the compound). For example, the method may include any coating method available in the related art.

In the positive electrode, the positive active material may be included in an amount of about 90 wt % to about 98 wt % based on a total weight of the positive active material layer.

In some embodiments, the positive active material layer may further include a binder and a conductive material. Herein, the binder and the conductive material may each independently be included in an amount of about 1 wt % to about 5 wt %, respectively based on a total amount of the positive active material layer.

The binder serves to attach positive active material particles to each other and to attach positive active material to the current collector. Non-limiting examples thereof include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material is included to provide or increase electrode conductivity. Any electrically conductive material may be used as a conductive material unless it causes an unwanted chemical change. Non-limiting examples of the conductive material include a carbon-based material (such as natural graphite, artificial graphite, carbon black, acetylene black, ketjen black, carbon fiber and/or the like); a metal-based material of a metal powder and/or a metal fiber including copper, nickel, aluminum, silver, and/or the like; a conductive polymer (such as a polyphenylene derivative); and mixtures thereof.

The current collector may be or include Al, but embodiments of the present disclosure are not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

Non-limiting examples of the carbonate based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Non-limiting examples of the ester-based solvent include methyl acetate, ethyl acetate, n-propyl acetate, dimethylacetate, methylpropionate, ethylpropionate, decanolide, mevalonolactone, caprolactone, and the like. Non-limiting examples of the ether-based solvent include dibutyl ether, tetraglyme, diglyme, dimethoxyethane, 2-methyltetrahydrofuran, tetrahydrofuran, and the like. Non-limiting examples of the ketone-based solvent include cyclohexanone and the like. Non-limiting examples of the alcohol-based solvent include ethyl alcohol, isopropyl alcohol, and the like, and non-limiting examples of the aprotic solvent include nitriles (such as R—CN, where R is a C2 to C20 linear, branched, and/or cyclic hydrocarbon including a double bond, an aromatic ring, and/or an ether bond), amides (such as dimethylformamide), dioxolanes (such as 1,3-dioxolane), sulfolanes, and the like.

The organic solvent may be used as a mixture of one or more types or kinds of solvent. When the mixture of two or more types or kinds of solvent is used, the mixing ratio may be appropriately or suitably adjusted according to desired or suitable battery performance, as understood by a person having an ordinary skill in the related art.

In some embodiments, the carbonate-based solvent may include a mixture of a cyclic carbonate and a chain-type carbonate. For example, when the cyclic carbonate and the chain-type carbonate are mixed together in a volume ratio of about 1:1 to about 1:9, performance of an electrolyte solution may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1:

Chemical Formula 1

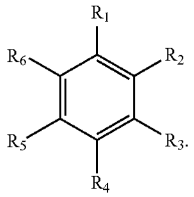

In Chemical Formula 1, $R_1$ to $R_6$ are the same or different and are each independently selected from hydrogen, a halogen, a C1 to C10 alkyl group, and a haloalkyl group.

Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include an additive, for example, vinylene carbonate and/or an ethylene carbonate-based compound of Chemical Formula 2, in order to improve a cycle-life of a battery:

Chemical Formula 2

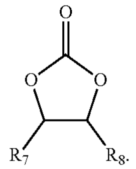

In Chemical Formula 2, $R_7$ and $R_8$ are the same or different and are each independently selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group; and $R_7$ and $R_8$ are not simultaneously hydrogen.

Non-limiting examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving a cycle-life may be used in an appropriate or suitable amount, as understood by those having ordinary skill in the art.

The lithium salt dissolved in the organic solvent supplies a battery with lithium ions, facilitates basic operation of the rechargeable lithium battery, and improves transportation of lithium ions between positive and negative electrodes. The lithium salt may include at least one supporting salt selected from $LiPF_6$, $LiBF_4$, $LiSbF_6$, $LiAsF_6$, $LIN(SO_2C_2F_5)_2$, $Li(CF_3SO_2)_2N$, $LIN(SO_3C_2F_5)_2$, $LiC_4F_9SO_3$, $LiClO_4$, $LiAlO_2$, $LiAlCl_4$, $LIN(C_xF_{2x+1}SO_2)(C_yF_{2y+1}SO_2)$ (wherein x and y are natural numbers, for example an integer ranging from 1 to 20), LiCl, LiI, and $LiB(C_2O_4)_2$ (lithium bis (oxalato) borate:LiBOB). A concentration of the lithium salt may be about 0.1 M to about 2.0 M. When the lithium salt is included in the above concentration range, the electrolyte may have excellent performance and/or lithium ion mobility due to optimal or suitable electrolyte conductivity and/or viscosity.

A separator may be included between the positive electrode and the negative electrode depending on the type or kind of rechargeable lithium battery. The separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, a prismatic rechargeable lithium battery is described as an example of a rechargeable lithium battery.

Figure 3:
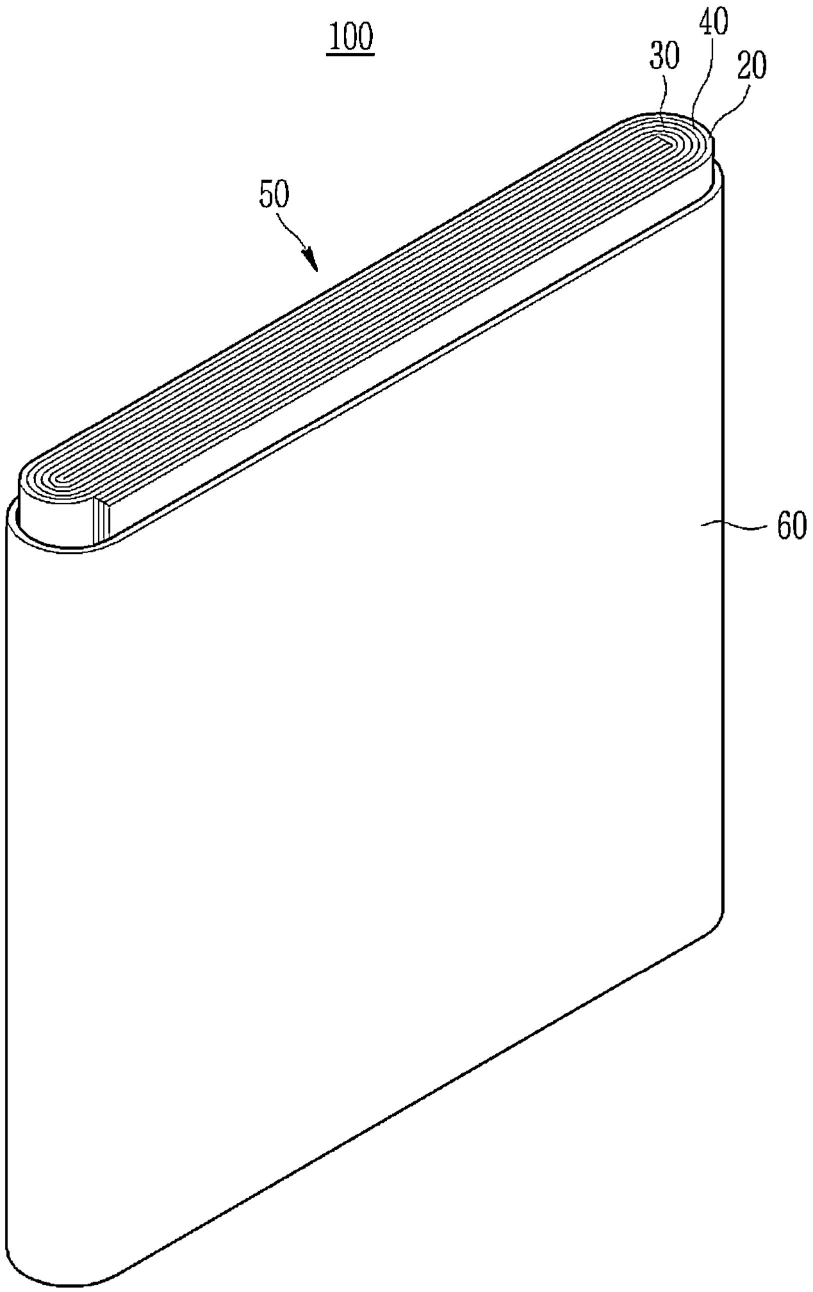
FIG. 3 is a perspective view of a rechargeable lithium battery according to an embodiment of the present disclosure.

FIG. 3 is a perspective view of a rechargeable lithium battery according to an embodiment of the present disclosure.

Referring to FIG. 3, a rechargeable lithium battery 100 according to an embodiment of the present disclosure includes an electrode assembly 50 manufactured by winding a separator 40 interposed between a positive electrode 20 and a negative electrode 30, and a case 60 housing the electrode assembly 50. An electrolyte may be impregnated in the positive electrode 20, the negative electrode 30, and the separator 40.

The rechargeable lithium battery is shown as a prismatic battery in FIG. 3, but embodiments of the present disclosure are not limited thereto, and the disclosure may be applied to various types or formats of batteries (such as cylindrical, pouch-type, or coin-type batteries).

Hereinafter, example embodiments of the present disclosure and comparative examples are described in more detail. However, embodiments of the present disclosure are not limited thereto.

EXAMPLES

Example 1

Silicon nanoparticles (aspect ratio: 5, average particle diameter: about 100 nm) and petroleum-based pitch (amorphous carbon) in a weight ratio of 70:30 were mixed in an isopropyl alcohol solvent and dispersed using a homogenizer to prepare a dispersion (mixture). The prepared dispersion was sprayed using a spray-drier at 120° C. The spray-dried product (a precursor) was pressed under 50 MPa with a powder presser and heat-treated at 1000° C. in a furnace under a $N_2$ atmosphere to prepare a reaction product including a core including amorphous carbon and silicon nanoparticles and a coating layer including amorphous carbon on the surface of the core. The reaction product was pulverized and sieved with a 325 mesh to prepare a negative active material composite powder.

Example 2

A negative active material composite was prepared according to substantially the same method as Example 1 except that the precursor was pressed under 75 MPa.

Example 3

A negative active material composite was prepared according to substantially the same method as Example 1 except that the precursor was pressed under 120 MPa.

Example 4

A negative active material composite was prepared according to substantially the same method as Example 1 except that the precursor was pressed under 150 MPa.

Comparative Example 1

A negative active material composite was prepared according to substantially the same method as Example 1 except that the precursor was pressed under 20 MPa.

Comparative Example 2

A negative active material composite was prepared according to substantially the same method as Example 1 except that the precursor was not pressed.

Evaluation Examples

Figure 4:
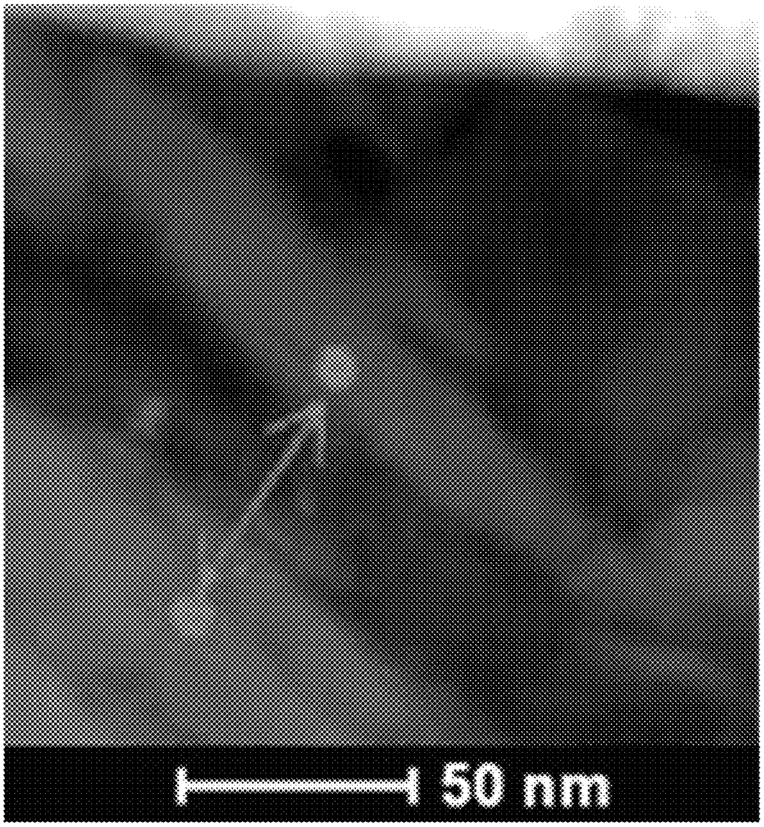
FIG. 4 is a transmission electron microscopy (TEM) image showing an example distance measurement between adjacent silicon nanoparticles of the negative active material composite prepared in Example 2.

Evaluation Example 1: Measurement of Adjacent Distance Between Silicon Nanoparticles and Average Particle Diameter (D50) of Negative Active Material Composite The cross section of each negative active material composite powder according to Examples 1 to 4 and Comparative Example 1 to 2 was analyzed through transmission electron microscopy (TEM) to measure an average adjacent distance between adjacent silicon nanoparticles. The results are shown in Table 1, and FIG. 4 is an example TEM photograph of the adjacent distance between the silicon nanoparticles of the negative active material composite according to Example 2.

The adjacent distance between silicon nanoparticles was obtained by measuring the distance between centers of silicon nanoparticles.

Figure 5:
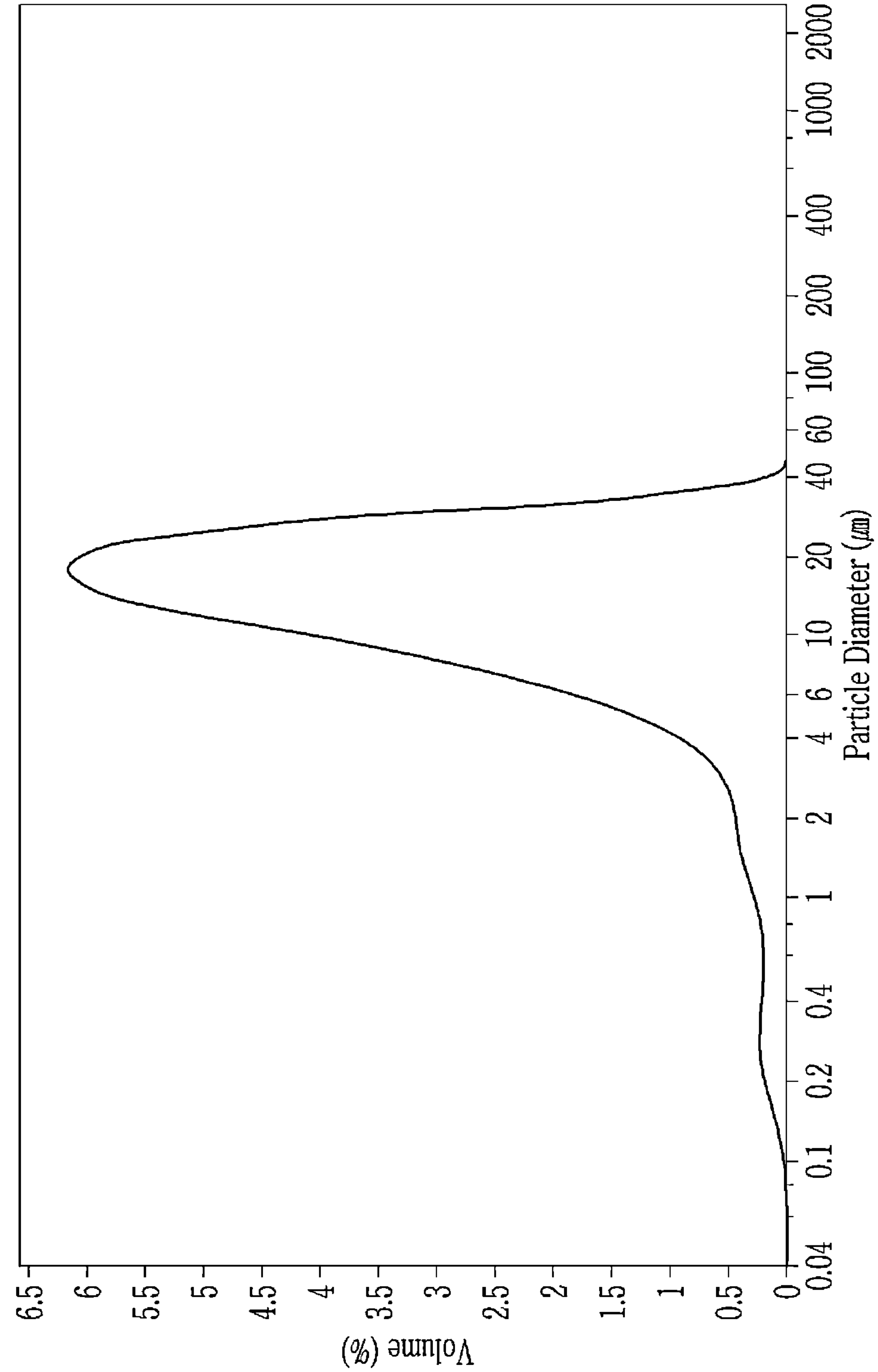
FIG. 5 is a graph of the particle diameter volume distribution (where the peak maximum corresponds to D50) of the negative active material composite prepared in Example 3.

The average particle diameter (D50) of each negative active material composite was measured using PSA (Particle Size Analysis) equipment (Beckman Coulter, Inc.). The results are shown in Table 1, and FIG. 5 is a graph showing the average particle diameter (D50) of the negative active material composite according to Example 3.

TABLE 1

| | Adjacent distance between silicon nanoparticles (nm) | Average particle diameter (D50) of negative active material composite (μm) |
|---|---|---|
| Example 1 | 65 | 8.3 |
| Example 2 | 50 | 8.2 |
| Example 3 | 35 | 8.5 |
| Example 4 | 30 | 8.1 |
| Comparative Example 1 | 115 | 8.4 |
| Comparative Example 2 | 200 | 8.9 |

Referring to Table 1 and FIG. 4, the negative active material composites according to Examples 1 to 4 exhibited an adjacent distance between silicon nanoparticles of less than or equal to 65 nm and more than or equal to 30 nm, which was decreased compared to the negative active material composites according to Comparative Examples 1 and 2. Referring to Table 1 and FIG. 5, the average particle diameters (D50) of the negative active material composites according to Examples 1 to 4 were between 13.3 to 14.5 μm.

Evaluation Example 2: SEM (Scanning Electron Microscopy) Image Analysis of Negative Active Material Composite The negative active material composite of Example 3 was analyzed using scanning electron microscopy (SEM), and the result is shown in FIG. 6.

Figure 6:
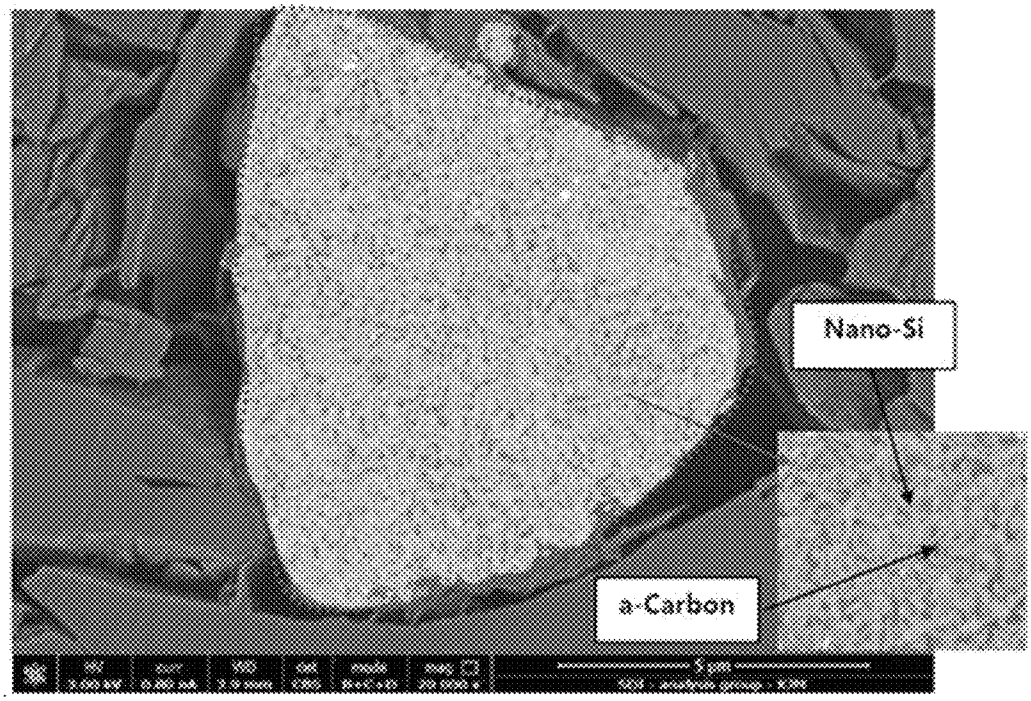
FIG. 6 is a scanning electron microscopy (SEM) photograph of the negative active material composite prepared in Example 3.

Referring to FIG. 6, silicon nanoparticles (Nano-Si) and amorphous carbon (a-carbon) were uniformly mixed and distributed inside a core of the negative active material composite. The amorphous carbon included in a coating layer of the negative active material composite was present as a thin film, although poorly visible in the printed SEM image.

Evaluation Example 3: Specific Capacity, Initial Efficiency, and Room Temperature Cycle-life Characteristics of Rechargeable Lithium Battery Cells 97.5 wt % of a mixture of each negative active material composite according to Examples 1 to 4 and Comparative Examples 1 to 2 and natural graphite mixed in a weight ratio of 20:80, 1.0 wt % of carboxylmethyl cellulose, and 1.5 wt % of a styrene-butadiene rubber were mixed in water as a solvent to prepare a negative active material slurry. The prepared negative active material slurry was coated on a copper foil current collector, and then dried and compressed to manufacture a negative electrode.

In addition, 94 wt % of lithium cobalt oxide ($LiCoO_2$) as a positive active material, 3 wt % of ketjen black, and 3 wt % of polyvinylidene fluoride were mixed in N-methyl pyrrolidone as a solvent to prepare a positive active material slurry, and the slurry was coated on one surface of an Al foil current collector, and then dried and compressed to manufacture a positive electrode.

The manufactured negative and positive electrodes and an electrolyte were used to manufacture a rechargeable lithium battery cell.

The electrolyte was prepared by dissolving 1 M $LiPF_6$ in a mixed solvent of ethylene carbonate and dimethyl carbonate (volume ratio of 3:7).

The rechargeable lithium battery cell was once charged and discharged at 0.1C, and the specific capacity and initial charge and discharge efficiency thereof were evaluated, the results of which are shown in Table 2.

In order to evaluate room temperature cycle-life characteristics of the rechargeable lithium battery cell, the rechargeable lithium battery cells were charged and discharged 100 times at 0.5C at 25° C. The ratios of the discharge capacity at the $100^{th}$ cycle relative to discharge capacity at the $1^{st}$ cycle were calculated, and the results are shown in Table 2.

TABLE 2

| | Discharge capacity (mAh/g) | Initial charge and discharge efficiency (%) | Room temperature cycle-life (25° C., 0.5 C, $100^{th}$ cycle) (%) |
|---|---|---|---|
| Example 1 | 1601 | 90.2 | 80.2 |
| Example 2 | 1650 | 90.7 | 81.3 |
| Example 3 | 1701 | 91.2 | 82.5 |
| Example 4 | 1742 | 90.1 | 82.3 |
| Comparative Example 1 | 1420 | 85.5 | 73.2 |
| Comparative Example 2 | 1017 | 79.3 | 70.1 |

Referring to Table 2, the rechargeable lithium battery cells respectively including the negative active material composites according to Examples 1 to 4 all exhibited improved specific capacities, improved initial charge and discharge efficiency, and improved room temperature cycle-life characteristics compared with rechargeable lithium battery cells respectively including the negative active material composites according to Comparative Examples 1 to 2.

Evaluation Example 4: Pore Volume of Negative Active Material Composite

The rechargeable lithium battery cell once charged and discharged at 0.1C in Evaluation Example 3 was disassembled, and a portion of the electrode in a non-reaction region was placed in pore-measuring equipment (ASAP series, Micromeritics Instrument Corp). The temperature of the pore-measuring equipment was increased at 10 K/min to 623 K, and then maintained for 2 hours to 10 hours (under a vacuum of less than or equal to 100 mmHg) as a pre-treatment. Herein, the temperature and the time may be appropriately or suitably adjusted depending on the negative active material composite powders.

Subsequently, a pore volume of the electrode portion was measured in liquid nitrogen adjusted to have a relative pressure ($P/P_o$) of less than or equal to 0.01. For example, the pore volume was obtained by measuring nitrogen desorption at 24 points (decrements) down to a relative pressure of 0.14 after nitrogen absorption at 32 points (increments) from a relative pressure of 0.01 to 0.995. In some embodiments, the pore volume may be calculated using BET up to a relative pressure ($P/P_o$) of 0.1. A total volume measurement result of pores having a size of less than or equal to 200 nm is shown in Table 3.

TABLE 3

| | Pore volume ($\times 10^{-2}$ $cm^3/g$) |
|---|---|
| Example 1 | 2.95 |
| Example 2 | 2.5 |
| Example 3 | 1.3 |
| Example 4 | 0.5 |
| Comparative Example 1 | 10.2 |
| Comparative Example 2 | 30.6 |

Referring to Table 3, the negative active material composites according to Examples 1 to 4 had a total pore volume of less than or equal to $3.0\times 10^{-2}$ $cm^3/g$, with the pore size being less than or equal to 200 nm, which was greatly decreased compared to the negative active material composites according to Comparative Examples 1 to 2.

As used herein, the terms "use", "using", and "used" may be considered synonymous with the terms "utilize", "utilizing", and "utilized", respectively. As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims and equivalents thereof.

| Description of Some of the Symbols | |
|---|---|
| 1: negative active material composite | |
| 1a: negative active material composite of related art | |
| 3: core | 5: coating layer |
| 11: silicon nanoparticle | 13: pore |
| 13a: pore of negative active material composite of related art | |
| 20: positive electrode | 30: negative electrode |
| 40: separator | 50: electrode assembly |
| 60: battery case | 100: rechargeable lithium battery |

What is claimed is:

1. A negative electrode comprising a negative active material composite comprising:

a core;

an amorphous carbon coating layer around the core; and pores, the core comprising amorphous carbon and silicon nanoparticles, the silicon nanoparticles having an aspect ratio of about 2 to about 8, an average distance between adjacent silicon nanoparticles being less than or equal to about 70 nm, and the pores having a total pore volume of less than or equal to about $3.0\times 10^{-2}$ $cm^3/g$, wherein the silicon nanoparticles have an average particle diameter (D50) of about 50 nm to about 150 nm.

2. The negative electrode of claim 1, wherein an X-ray diffraction (XRD) peak of a (111) plane of the silicon nanoparticles has a full width at half maximum (FWHM) of about 0.3° to about 7°.

3. The negative electrode of claim 1, wherein the pores have an average pore size of less than or equal to about 200 nm.

4. The negative electrode of claim 1, wherein the silicon nanoparticles are in an amount of about 20 wt % to about 80 wt %, based on a total weight of the negative active material composite.

5. The negative electrode of claim 1, wherein the amorphous carbon in at least one of the core or the amorphous carbon coating layer is a soft carbon, a hard carbon, a mesophase pitch carbonized product, a fired coke, or any combination thereof.

6. The negative electrode of claim 1, wherein the amorphous carbon is in an amount of about 20 wt % to about 80 wt %, based on a total weight of the negative active material composite.

7. The negative electrode of claim 1, wherein the amorphous carbon coating layer has a thickness of about 1 nm to about 900 nm.

8. The negative electrode of claim 1, wherein the negative active material composite has an average particle diameter (D50) of about 2 μm to about 15 μm.

9. The negative electrode of claim 1, wherein the negative active material composite has a BET specific surface area of less than or equal to about 10 $m^2/g$.

10. A rechargeable lithium battery, comprising:

a positive electrode comprising a positive active material;

the negative electrode of claim 1; and an electrolyte.

11. A negative electrode comprising a negative active material composite comprising:

a core;

an amorphous carbon coating layer around the core; and pores, the core comprising amorphous carbon and silicon nanoparticles, the amorphous carbon excluding graphite, an average distance between adjacent silicon nanoparticles being less than or equal to about 70 nm, the silicon nanoparticles having an aspect ratio of about 2 to about 8, and the pores having a total pore volume of less than or equal to about $3.0\times10^{-2}$ $cm^3/g$, and the silicon nanoparticles have an average particle diameter (D50) of about 50 nm to about 150 nm.

12. The negative electrode of claim 11, wherein the pores have an average pore size of less than or equal to about 200 nm.

* * * * *